(12) United States Patent
McEvoy et al.

(10) Patent No.: US 7,329,875 B2
(45) Date of Patent: Feb. 12, 2008

(54) DETECTOR ARRAY FOR IMAGING SYSTEM AND METHOD OF MAKING SAME

(75) Inventors: Kevin Paul McEvoy, Ballston Spa, NY (US); James Scott Vartuli, Rexford, NY (US); Stephen Thomas Tedeschi, Schenectady, NY (US); Steven Jude Duclos, Clifton Park, NY (US); Martin Kin-Fei Lee, Niskayuna, NY (US); Venkat Subramaniam Venkataramani, Clifton Park, NY (US); James Anthony Brewer, Scotia, NY (US); Robert Joseph Lyons, Burnt Hills, NY (US); Mohandas Nayak, Bangalore (IN)

(73) Assignee: General Electric Company, Niskayuna, NY (US)

( * ) Notice: Subject to any disclaimer, the term of this patent is extended or adjusted under 35 U.S.C. 154(b) by 284 days.

(21) Appl. No.: 10/996,261

(22) Filed: Nov. 23, 2004

(65) Prior Publication Data
US 2006/0108533 A1    May 25, 2006

(51) Int. Cl.
*G01T 1/24* (2006.01)
*B29D 11/00* (2006.01)
(52) U.S. Cl. .................... 250/367; 264/1.1
(58) Field of Classification Search ............ 250/367, 250/483.1, 487.1, 370.11; 378/19, 147, 98.9; 264/1.1
See application file for complete search history.

(56) References Cited

U.S. PATENT DOCUMENTS

| | | | | |
|---|---|---|---|---|
| 5,187,369 A * | 2/1993 | Kingsley et al. | ........ | 250/370.11 |
| 5,519,227 A * | 5/1996 | Karellas | ........ | 250/483.1 |
| 6,448,566 B1 | 9/2002 | Reidner et al. | ........ | 250/483.1 |
| 6,586,702 B2 | 7/2003 | Wiener-Avnear et al. | ........ | 219/121.6 |
| 6,766,817 B2 | 7/2004 | da Silva | | |
| 6,898,265 B1 * | 5/2005 | Mliner et al. | ........ | 378/19 |
| 6,990,176 B2 * | 1/2006 | Sherman et al. | ........ | 378/98.8 |
| 7,054,408 B2 * | 5/2006 | Jiang et al. | ........ | 378/19 |
| 2003/0235272 A1 * | 12/2003 | Appleby et al. | ........ | 378/147 |
| 2004/0042585 A1 * | 3/2004 | Nagarkar et al. | ........ | 378/98.8 |
| 2004/0114467 A1 | 6/2004 | Wiener-Avnear et al. | ... | 367/180 |
| 2004/0156478 A1 * | 8/2004 | Appleby et al. | ........ | 378/147 |
| 2005/0104000 A1 * | 5/2005 | Kindem et al. | ........ | 250/361 R |
| 2005/0111613 A1 * | 5/2005 | Mliner et al. | ........ | 378/19 |
| 2007/0138409 A1 * | 6/2007 | Daniel | ........ | 250/483.1 |

OTHER PUBLICATIONS

W. Bauer, R. Knitter; "Development of a rapid prototyping process chain for the production of ceramic microcomponents"; Journal of Materials Science 37 (2002) 3127-3140.

* cited by examiner

*Primary Examiner*—David Porta
*Assistant Examiner*—Faye Boosalis
(74) *Attorney, Agent, or Firm*—Fletcher Yoder

(57) ABSTRACT

A method of manufacturing a detector array for an imaging system, the method comprising providing a pixelated scintillator having a plurality of lost molded pixels comprising a scintillator material adapted to detect radiation.

106 Claims, 8 Drawing Sheets

DETECTOR ARRAY FOR IMAGING SYSTEM AND METHOD OF MAKING SAME

BACKGROUND

The invention relates generally to imaging systems. In particular, the invention relates to a detector array for use in an imaging system and a method of making the same.

Detector arrays are used in a wide variety of imaging systems, such as computed tomography (CT), x-ray, and other radiation-based imaging systems. In operation, these imaging systems pass radiation through a subject and, after being attenuated by internal features of the subject, the radiation strikes pixelated scintillators. The scintillator material of these pixelated scintillators creates light in response to the received radiation. In other words, the intensity of the radiation received at the pixelated scintillators is generally dependent upon the attenuation of the radiation by the subject. Moreover, each pixel of the pixelated scintillator is separately illuminated in response to the attenuated beam received by the respective pixel of the pixelated scintillator. In this manner, these separately illuminated pixels of the pixelated scintillators facilitate the generation of an image of the internal features of the subject.

In radiation-based imaging systems, various features cooperate with the pixelated scintillators to create the desired image. In CT imaging systems, the x-ray source and the detector array are rotated within an imaging plane about the gantry surrounding the subject. X-ray sources typically include x-ray tubes, which emit the x-ray beam directed at a focal point. The CT imaging systems also generally include a collimator for collimating x-ray beams directed toward the pixelated scintillators. As noted above, the pixelated scintillators include a scintillator material that converts the x-ray radiation into light. Each illuminated pixel of the pixelated scintillator is detected by a respective photodiode, which converts the light into electrical signals used for imaging purposes. During data collection, each pixel provides an electrical output signal representative of the light intensity present in that pixel of the pixelated scintillator. These output signals are then processed to create an image of the internal features of the subject.

In imaging systems for medical and other diagnostic applications, an ongoing goal is the development of a low-cost, high quality, high resolution imaging system for an opaque target. In order to achieve high-resolution images in CT detectors, it is desired to have a pixelated scintillator having a large number of individual pixels. Ideally, each pixel is dimensionally equivalent throughout the pixelated scintillator. Existing manufacturing techniques for making these pixelated scintillators or other structures having parallel members, such as heat sinks, sensors arrays, lasers, radiative heaters, parallel plate capacitors, and the like, may involve dicing the material into small pieces and manually assembling them into a structure with a desired geometry prior to attachment to a device/system. This process is very tedious, costly, and prone to errors. Also, the pixels formed by this process have a relatively limited shape, depth, and other features. In case of pixelated scintillator, in an alternative technique, the pixelated scintillator is formed by ablating regions of the scintillator material using laser beams or electromagnetic radiations. However, this latter technique is relatively expensive and demonstrates marginal performance.

Accordingly, a need exists for a relatively fast, precise, and low cost technique for fabricating pixelated structures, such as pixelated scintillator arrays, for use in various systems.

BRIEF DESCRIPTION

In certain embodiments, the present technique provides a method of manufacturing a detector array for an imaging system. The method includes providing a pixelated scintillator having a plurality of lost molded pixels comprising a scintillator material adapted to detect radiation.

In another embodiment, the present technique provides a method of manufacturing an imaging system including providing a radiation source adapted to transmit radiation through an object, and providing a pixelated scintillator having a plurality of pixels formed by a mold structure removed in place about the plurality of pixels.

In a further embodiment, the present technique provides an imaging system having a radiation source configured to transmit radiation through an object, and a pixelated scintillator having a plurality of lost molded pixels adapted to detect the radiation.

In another embodiment, the present technique provides a detector array for use in imaging system. The detector array includes a pixelated scintillator having a plurality of lost molded pixels adapted to detect the radiation.

In further embodiment, the present technique provides a method of manufacturing a pixelated scintillator including inserting a substance including a scintillator material into a lost mold, and dissolving the lost mold leaving a pixelated scintillator having a plurality of pixels.

In another embodiment, the present technique provides a method of manufacturing a pixelated scintillator including inserting a substance including a scintillator material into a lost mold, and melting the lost mold leaving a pixelated scintillator having a plurality of pixels

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
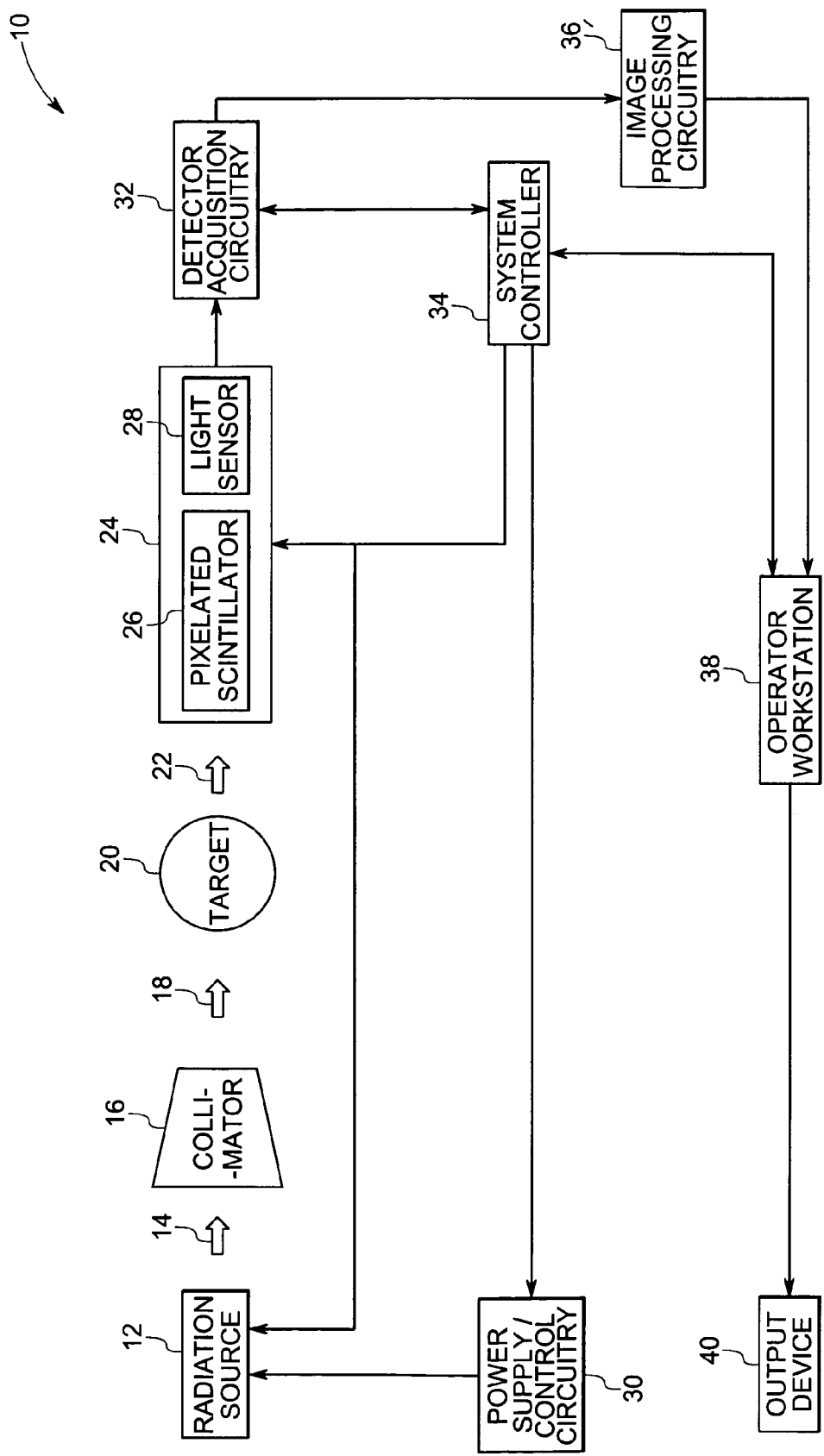
FIG. 1 is a diagrammatical representation of an exemplary radiation-based imaging system having pixelated scintillators according to certain embodiments of the present technique.

FIG. 1 illustrates an exemplary radiation-based imaging system, such as computed tomography, in accordance with certain embodiments of the present technique. In the illustrated embodiment, the imaging system 10 includes a radiation source 12 positioned adjacent a collimator 16. In operation, the radiation source 12 emits radiation 14 toward the collimator 16, which then collimates the radiation 14 as collimated beams 18. In certain embodiments, the radiation may be x-ray radiation, beta radiation, or gamma radiation. The collimated beams 18 of the radiation 14 are directed toward a target 20, such as an animal, a human, baggage, an object, or any other target having internal features or contents. A portion of the radiation, generally termed as attenuated radiation 22, passes through the target 20. More specifically, the internal features of the target 20 at least partially reduce the intensity of the collimated beams 18 of radiation 14. For example, one internal feature may pass more or less radiation than another internal feature. In turn, attenuated radiation 22 impinges one or more radiation detectors 24, which include pixelated scintillators 26 that become illuminated based on the extent of attenuation. Corresponding optical or light sensors 28 (e.g., photodiodes) then convert the light detected from the pixelated scintillators 26 into electrical signals. The imaging system 10 then processes these electrical signals to construct an image of the internal features within the target 20.

In addition, the imaging system 10 of FIG. 1 may include a variety of control circuiting and devices. As illustrated, the radiation source 12 is controlled by a power supply/control circuit 30, which furnishes both power and control signals for examination sequences. Moreover, the radiation detector 24 is coupled to detector acquisition circuitry 32, which controls acquisition of the signals generated in the radiation detector 24. In certain embodiments, the imaging system 10 includes a motor subsystem (not shown) to facilitate motion of the radiation source 12 and/or the detector 24. The power supply/control circuit 30 and the optional motor subsystem are responsive to signals from a system controller 34. The system controller 34 generally controls operation of imaging processing circuitry 36 to execute examination protocols and to process acquired image data. These and various other control mechanisms may be incorporated into the imaging system 10 in accordance with certain embodiments of the present technique.

As an interface to the imaging system 10, one or more operator workstations 38 may be included for outputting system parameters, requesting examination, viewing images, and so forth. The operator workstation 38 is configured to enable an operator, via one or more input devices (keyboard, mouse, touchpad, etc.), to control the operation of the system controller 34 and, if necessary, other components of the imaging system 10. The illustrated operator workstation 38 is coupled to an output device 40, such as a display or printer, to output the images generated during operation of the imaging system 10. In general, displays, printers, operator workstations, and similar devices may be local or remote from the imaging system 10. For example, these interface devices may be positioned in one or more places within an institution or hospital, or in an entirely different location. Therefore, the interfaces devices may be linked to the image system 10 via one or more configurable networks, such as the internet, virtual private networks, and so forth. These and other input/output devices or interfaces may be incorporated into the imaging system 10 in accordance with embodiments of the present technique.

Figure 2:
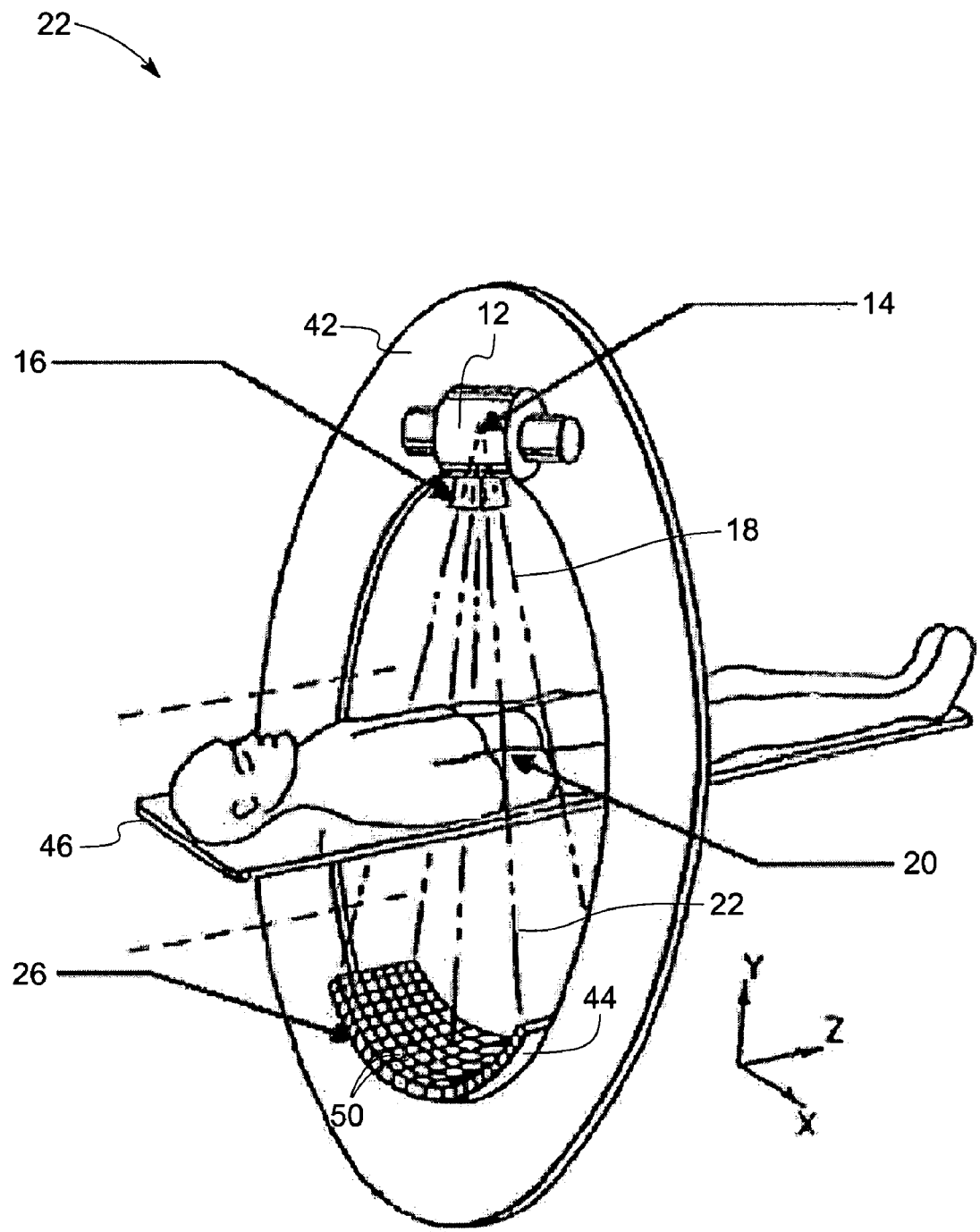
FIG. 2 is a perspective view of an exemplary radiation-based imaging system having a detector array according to certain embodiments of the present technique.

FIG. 2 is a perspective view illustrating certain components of the imaging system 10 of FIG. 1 in accordance with embodiments of the present technique. As illustrated, the imaging system 10 includes an annular structure 42 supporting the radiation source 12 and the collimator 14 on one side of the target 20 (e.g., patient), while an array 44 of the radiation detectors 24 is supported on an opposite side of the target 20. In certain embodiments, the annular structure 42 is rotatable about the target 20 to acquire a desired image of the target's internal features. Although not illustrated, a positioning mechanism may be coupled to a support structure 46 that supports the target 20 (e.g., patient). Thus, the target 20 may be moved lengthwise through the annular structure 42 of the imaging system 10. These and other features may be incorporated into the imaging system 10 in accordance with embodiments of the present technique.

Figure 3:
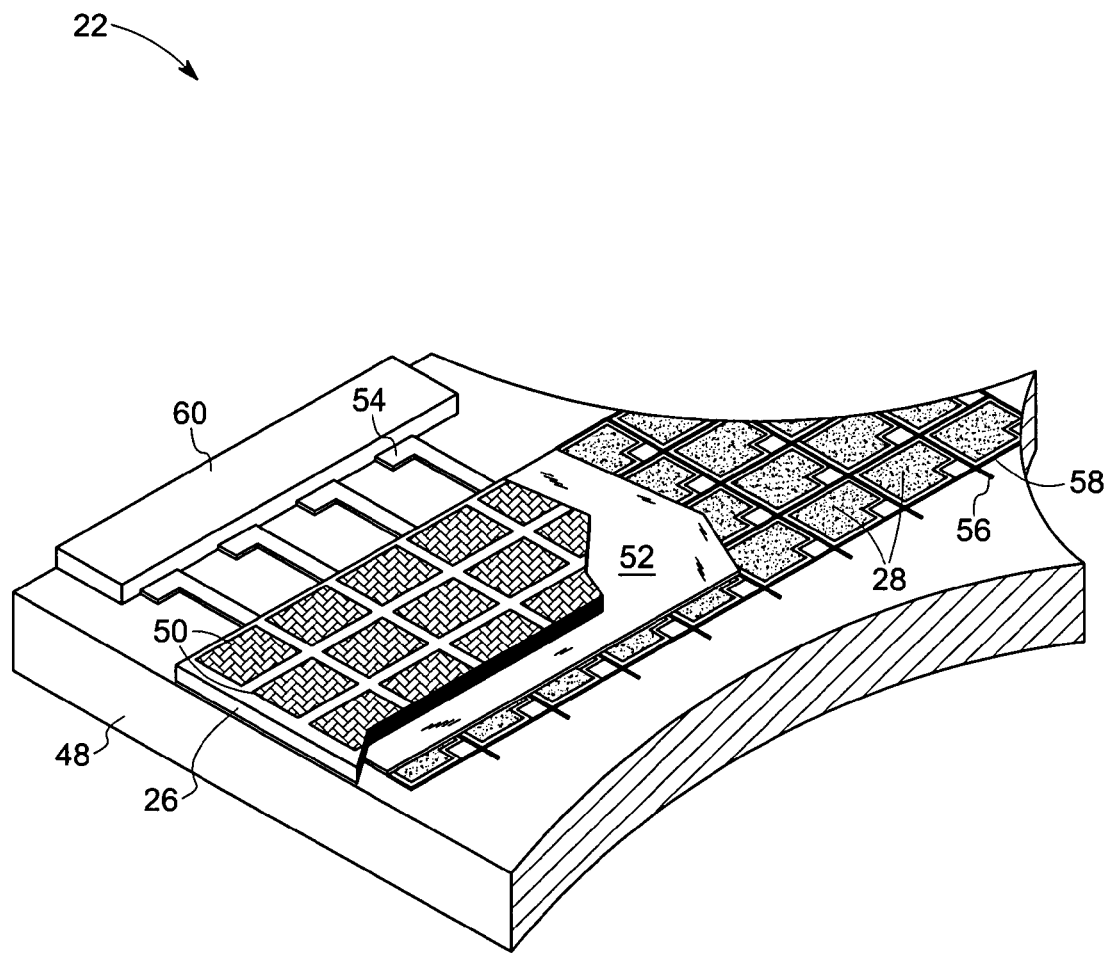
FIG. 3 is a perspective view of a detector array according to certain embodiments of the present technique.

Referring now to FIG. 3, an embodiment of the detector array 44 introduced in FIG. 2 is discussed in greater detail. In particular, FIG. 3 depicts an exemplary physical arrangement of the components of the detector array 44 in accordance with one embodiment of the present technique. The illustrated detector array 44 includes a substrate 48 that supports the pixelated scintillator 26 disposed over an array of optical or light sensors 28 (e.g., photosensor elements). The pixelated scintillator 26 (upon exposure to radiation) generates a signal, such as optical photons, which is detected by the optical or light sensors 28. In various embodiments, the pixelated scintillator 26 includes a plurality of pixels 50 having a predetermined shape. In certain embodiments, the plurality of pixels 50 may include pixels having a different size or shape. In some embodiments, the predetermined shape may be hexagonal, or cylindrical, or rectangular, or any other plane filling polygon, and different combinations of the foregoing geometries. Moreover, embodiments of the pixelated scintillator 26 are made of a ceramic, such as $(Y,Gd,Eu)_2O_3$, or $(Lu,Tb,Ce)_3Al_5O_{12}$, or $Gd_3Ga_5O_{12}$, or $(Lu,Ce)_3Al_5O_{12}$, or different combinations thereof and other suitable materials. Further, the detector array 44 may include a reflector layer (not shown) on the pixelated scintillator 26 to trap the optical photons, thereby reducing loss and improving the accuracy of the detector array 44. In addition, the detector array 44 may include a graphite cover (not shown) to seal the entire detector.

Figure 4:
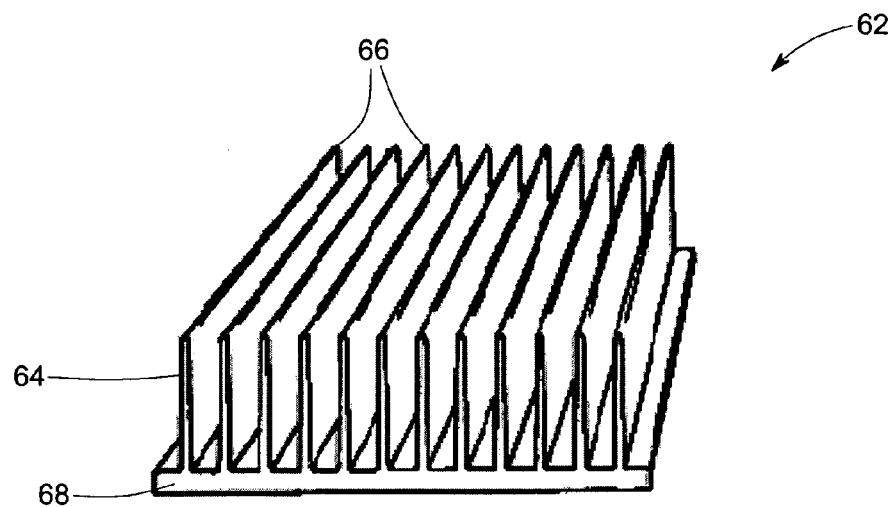
FIG. 4 is a perspective view of a heat sink employing a pixelated structure according to certain embodiments of the present technique.

Though, the present technique is used to make the pixelated scintillator 26, as will be appreciated by those skilled in the art, the present technique may be used to fabricate a variety of other pixelated structures, parallel plate structures, or structures having generally parallel members. For example, the present technique may be used to fabricate heat sinks, sensors arrays, lasers, radiative heaters, parallel plate capacitors, and other devices having pixelated or parallel members, such as pins, fins, plates, and so forth. FIG. 4 is a pictorial view of a heat sink 62 employing a parallel plate structure 64 in the form of a plurality of fins 66. The heat sink 62 further comprises a base plate 68 that holds the parallel plate structures 64 together.

Materials used for these applications may include nitrides, or carbides, or borides of Al, or Si, or Ti, or $Pb(Zr,Ti)O_3$, or $Y_3Al_5O_{12}$, or 89% $ZrO_2$-9% $Y_2O_3$, or $Al_2O_3$, or $Y_3Al_5O_{12}$:Nd, or $Y_3Al_5O_{12}$:Yb, or $Y_2O_3$:Nd, or $Y_2O_3$:Yb, ferrites, or particulate polymer composite, or refractory oxides, or metals, or dielectrics such as, titanates or zirconates of Ca, or Sr, or Ba, ferrites such as $(Zn,Mn)Fe_2O_4$, or $(Ni,Zn)Fe_2O_4$, or different combinations thereof and other suitable materials.

In an exemplary embodiment of the present technique, each of the photo or light sensors 28 is electrically coupled to a common electrode 52 comprised of an optically transmissive and electrically conductive material, such as indium tin oxide. The common electrode 52 of the array of light sensors 28 is disposed between the pixelated scintillator 26 and the array of light sensors 28. At the edge of the detector array 44, the common electrode 52 is continuous with the contact fingers 54, which communicate signals to and from data lines 56 and scan lines 58. In particular, these contact fingers 54 are connected to readout circuitry 60, which controls readout of all the light sensors 28 via the data and scan lines 56 and 58.

Figure 5:
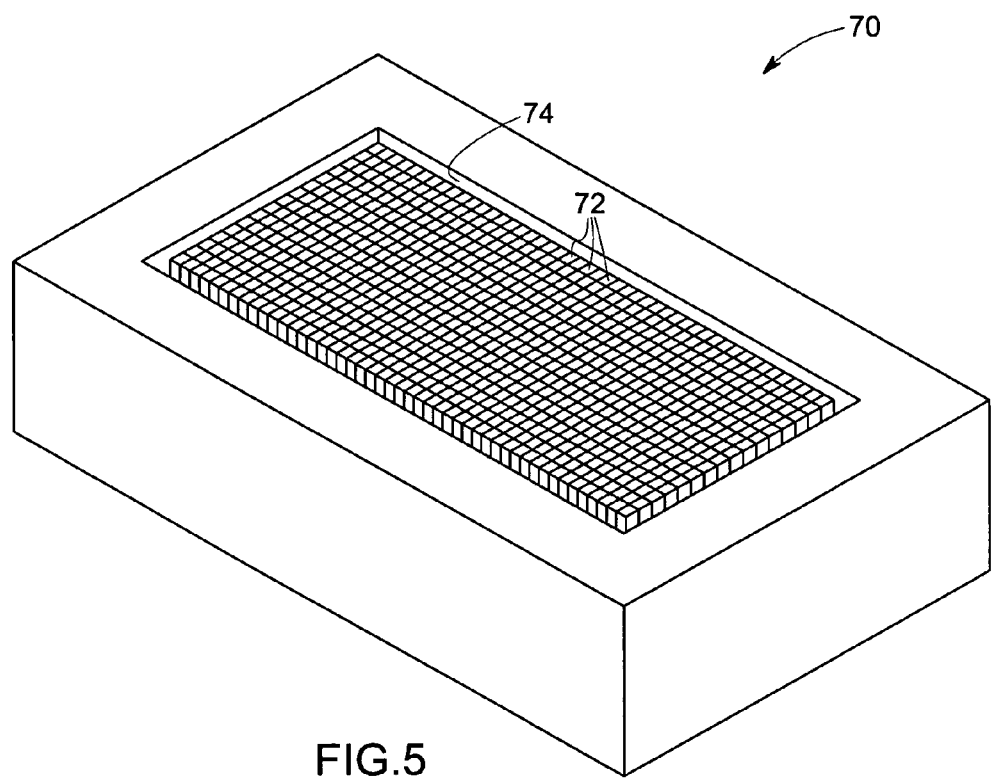
FIG. 5 is a perspective view of an exemplary master mold having structural features of a pixelated scintillator and surrounding receptacles to create a mold structure, which in turn, receives a desired detector material to mold the pixelated scintillator according to certain embodiments of the present technique.

In certain embodiments of the present technique, a slurry, mixture, compound, or other substance comprising scintillator material is molded into the form of the pixelated scintillator 26, such that the molded structure includes a plurality of molded pixels 50. For example, FIG. 7 illustrates an exemplary embodiment of the pixelated scintillator 26 formed by a mold structure 76 illustrated in FIG. 6. In turn, FIG. 5 illustrates an exemplary master mold 70 used to create the mold structure 76 of FIG. 6. As discussed in detail below, the mold structure 76 of FIG. 6 is dissolvable, meltable, sublimable, or generally removable in place about a molded scintillator material, such that removal of the mold structure 76 does not disturb the underlying pixelated scintillator 22 formed by the mold structure 76.

Turning now to FIG. 5, this figure is a pictorial view illustrating a master mold 70 having a plurality of model pixels 72 and a surrounding channel 74. These model pixels 72 and surrounding channel 74 are used to mold a desired material (e.g., dissolvable or meltable) into the form of the mold structure 76 of FIG. 6. In some embodiments, fabrication processes, such as wire electrical discharge machining (EDM), or laser lithography, or X-ray lithography, or printing, or the like, may be used to make the master the mold 70. In one embodiment, the master mold 70 is made by manually assembling precisely machined parts. In this embodiment, the master mold 70 may be created by assembling prisms of a desired shape, such as rectangular, or triangular, or cylindrical, and so forth. In certain embodiments, process variations, such as dimensional shrinkage of the compact, may also be addressed while making the master mold 70. For example, the dimensions of the model pixels 72 of the master mold may be made relatively larger than desirable dimensions of the compact to correspond to the dimensional shrinkage of the compact during processes such as, sintering.

Further embodiments of the master mold 70 may also be constructed to minimize light cross talk between pixels 50 and to channel the light to the array of light sensors 28. Light cross talk is generally defined as optical interaction between pixels 50. In one embodiment, the master mold 70 is made with a surface texture, so as to optimize the light transport to the array of light sensors 28. For example, the pixels 50 may be molded with ridges, or serrations, or waves, or dimples, or corner cubes, or other structures oriented lengthwise along the pixels 50 and generally perpendicular to the light sensor 28. In addition, the model pixels 72 may include a variety of end structures, such as flat, or curved, or angled ends. For example, the end structures may include an ellipse, or a parabola to optimize light transport beyond what a flat end provides.

Figure 6:
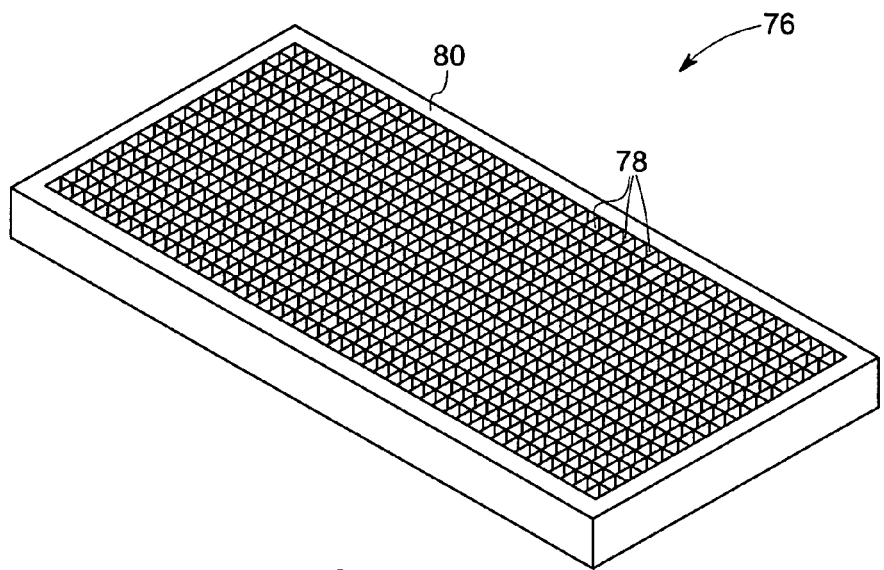
FIG. 6 is a perspective view of an exemplary mold structure formed by the master mold of FIG. 5 according to certain embodiments of the present technique.
Figure 7:
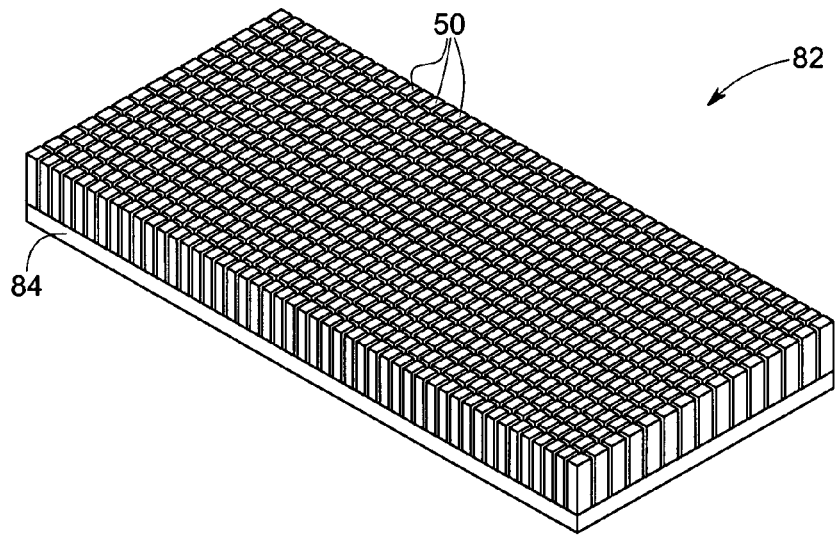
FIG. 7 is a perspective view of an exemplary pixelated scintillator formed by the mold structure of FIG. 6 according to certain embodiments of the present technique.

FIG. 6 is a pictorial view of a mold structure 76 having a plurality of cavities 78 molded from the model pixels 72 of the master mold 70 in accordance with embodiments of the present technique. In other words, the mold structure 76 is a negative image, or female counterpart, of the master mold 70 and the pixelated scintillator 26 formed by the mold structure 76. In addition to the cavities 78, the mold structure 76 includes an outer wall or support structure 80, which is molded from the channel 74 of the master mold 70 of FIG. 5. The mold structure 76 can be created from the master mold 70 using a variety of materials, thermal processes, injection techniques, and so forth. For example, the mold structure 76 can be made from the master mold 70 by using processes such as injection molding, or resin transfer molding, or mechanical machining methods, or casting, or solidification of a melt, or forging, or stamping, or embossing, or photolithography using radiation such as ultraviolet radiation, or X-rays, and other suitable radiation sources, or different combinations thereof. In one embodiment, the mold structure 76 includes a material that is removable, in place about a molded pixelated scintillator 26, to form a plurality of lost molded pixels as discussed in detail below. For example, the mold structure 76 may be made of polymer, organic, or readily dissolvable, meltable, or generally destroyable material. In certain embodiments, the mold structure 76 is made of camphor, or silicone, or cellulose, or acetate, or hard wax, or co-polymers, or tri-polymers, or polystyrene, or polystyrene-polybutadiene, or polycarbonate, or crystal bond, or paraffin wax, or polyethylene, or acrylic, or nylon, or polyethylene glycol, or low density polyethylene, or high density polyethylene, or different combinations thereof. As will be appreciated by those skilled in the art, when the mold structure 76 is made of camphor, the temperature of the mold structure 76 may be kept below sublimation temperature of the camphor prior to solidification of the slurry in the mold structure 76. After the mold structure 76 receives and shapes the pixelated scintillator 26, these exemplary materials enable the mold structure 76 to be dissolved, melted, sublimed, or generally destroyed without any movement of the mold structure 76 as a whole. In other words, the mold structure 76 is not forcibly pulled away from the pixelated scintillator 26 that was formed therein, but rather heat or chemicals are applied to the mold structure 76 to cause the material itself to become relatively liquid and flow away (melt, pyrolyze, sublime, or dissolve) from the pixelated scintillator 26. Thus, the mold structure 76 is materially removable in small portions with relatively no force, rather than being positionably removable as a whole with significant force. These characteristics of the mold structure 76 facilitate the creation of pixelated scintillators 26 having relatively complex shapes, surface features, and dimensions.

Figure 8:
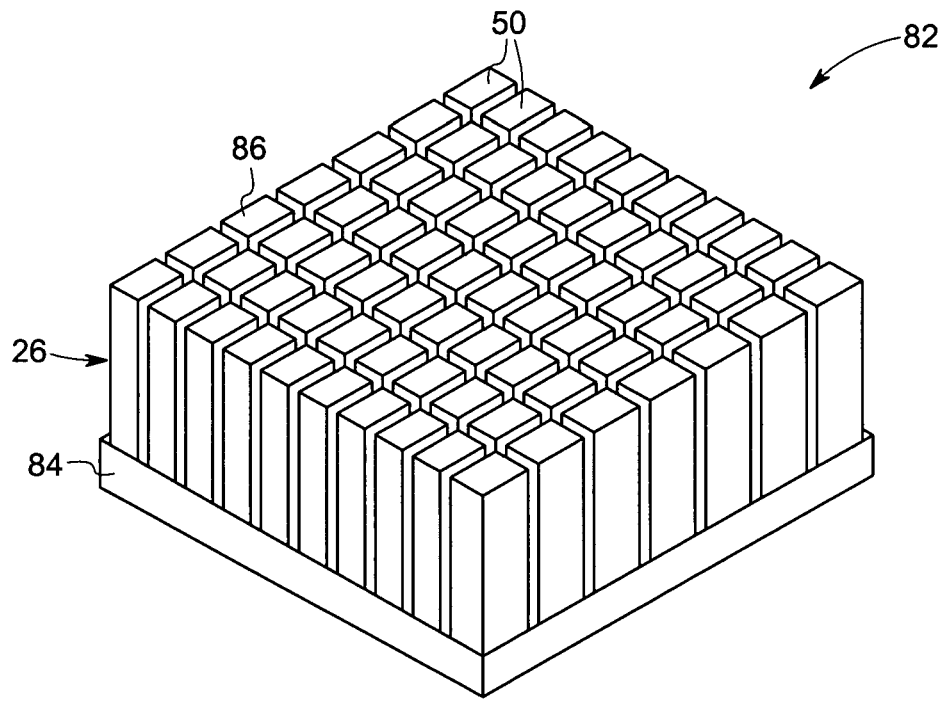
FIG. 8 is a partial perspective view of the pixelated scintillator of FIG. 7 illustrating exemplary features of individual pixels according to certain embodiments of the present technique.
Figure 9:
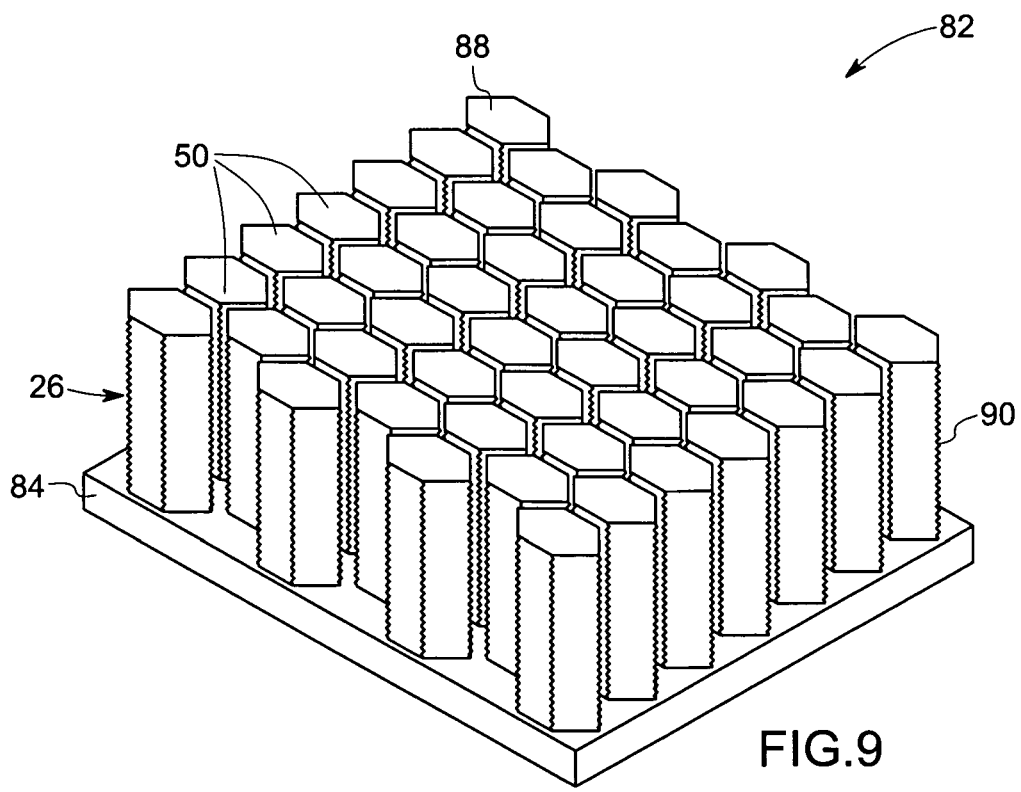
FIG. 9 is a partial perspective view of an alternative pixelated scintillator illustrating exemplary features of individual pixels according to certain embodiments of the present technique.

FIG. 7 is a perspective view of a molded or compact form 82 of the pixelated scintillators 26 created by the mold structure 76 of FIG. 6 in accordance with embodiments of the present technique. As discussed in further detail below, the mold structure 76 is removed, in place about the molded or compact form 82, to leave a relatively undisturbed (lost molded) pixelated scintillators 26 that include the plurality of pixels 50 extending outwardly from a base 84. In the illustrated embodiment, the plurality of pixels 50 each has a rectangular or square cross-section. FIG. 8 is a partial perspective view of the molded or compact form 82 of the pixelated scintillators 26 of FIG. 7 illustrating the pixels 50 having a rectangular cross-section 86 in accordance with embodiments of the present technique. However, other embodiments of the pixels 50 have other geometrical cross-sections, such as circular, oval, triangular, and so forth. In addition, some embodiments of the pixels 50 have a smooth outer surface, while other embodiments have a textured surface, e.g., serrations, ridges, and so forth. FIG. 9 is a partial perspective view of the molded or compact form 82 of the pixelated scintillators 26 illustrating the pixels 50 having a hexagonal cross-section 88 including a serrated or ridged outer surface 90, wherein the ridges extend lengthwise along the pixels 50 in accordance with embodiments of the present technique. As mentioned above, these different cross-sections and outer surfaces may substantially reduce cross-talk between adjacent pixels 50 and improve the transmission of light to the light sensors 28. These and other unique geometrical shapes and dimensions of the pixelated scintillators 26 are made possible by the lost mold structure 76 as illustrated in FIG. 6. Further, in certain embodiments of the present technique, the cross-talk is reduced by disposing a reflector material between the plurality of lost molded pixels. The reflector material may comprise an epoxy-titanium dioxide composite, a thin reflective metallic film, alternating layers of high/low dielectric comprising a dielectric mirror.

Figure 10:
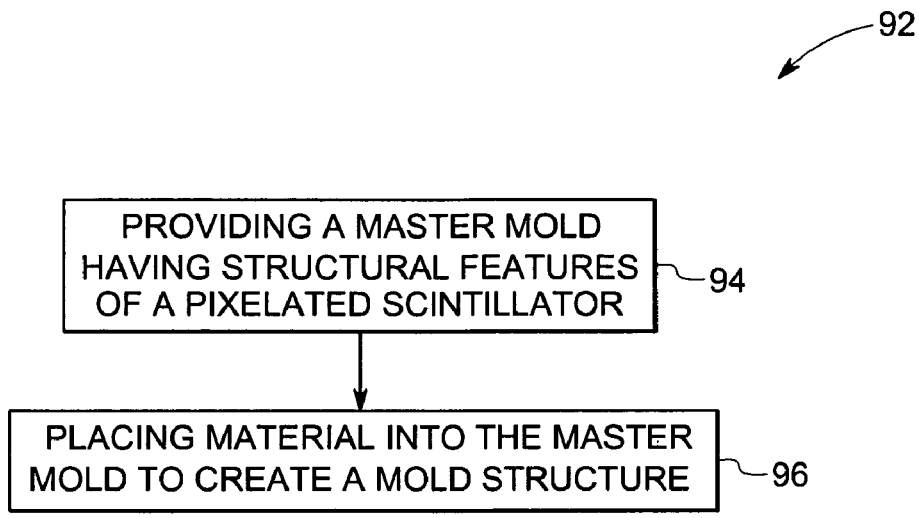
FIGS. 10, 11, 12 and 13 are flow charts illustrating exemplary methods for manufacturing a pixelated scintillator for use in an imaging system according to certain embodiments of the present technique.

Regarding the lost molding process associated with the pixelated scintillators 26 of FIG. 7 formed by the mold structure 76 of FIG. 6, the process may include a variety of steps that lead to a lost molded form of the pixelated 22 in accordance with embodiments of the present technique. For example, FIG. 10 is a flow chart illustrating one exemplary process 92 for manufacturing the mold structure 76 of FIG. 6 from the master mold 70 of FIG. 5 in accordance with embodiments of the present technique. As illustrated, the process 92 begins by providing the master mold 70 having the model pixels 72 of the pixelated scintillators 26 (block 94). In certain embodiments, the act of providing the master mold 70 involves obtaining a pre-manufactured master mold 70, modifying a pre-existing master mold 70 to have certain features (e.g., serrations, beveled tips, or other modifications of the model pixels 72), or actually manufacturing the master mold 70. For example, an exemplary manufacturing process may include wire electrical discharge machining (EDM), or laser lithography, or X-ray lithography, or printing, or machining, and so forth. Moreover, the material composition of the master mold 70 may include a ceramic, a steel (e.g., a tool steel), a ceramic-coated steel, or other suitable materials.

Using this master mold 70, the process 92 proceeds by placing material into the master mold 70 to create a lost mold, e.g., the mold structure 76 of FIG. 6 (block 96). In certain embodiments, the material includes a silicone, a cellulose, an acetate, a hard wax, a polystyrene, and so forth. As a result, the lost mold has the unique capability of being materially removable, in place about a scintillator material received therein, to form a lost molded pixelated scintillator, e.g., the molded or compact form 82 of the scintillator 26 illustrated in FIG. 7. In other words, the mold structure 76 is not positionally removed from the molded or compact form 82 of the pixelated scintillators 26, but rather the mold structure 76 melts, dissolves, or generally loses cohesion and flows away from the scintillator 26. For example, embodiments of the lost mold, e.g., mold structure 76, are dissolvable in chemical reagents, such as toluene, or tetrachloroethylene, or chloroform, or methylene chloride, or dibromomethane, or bromoethylene, or xylene, or acetone, or methyl ethyl ketone, or tetrahydrofuran, or hexane, or different combinations thereof. In view of this material removal feature, the lost mold, e.g., mold structure 76, is uniquely capable of creating complex shapes, dimensions, and surface features on the pixels 50 of the pixelated scintillator.

Figure 11:
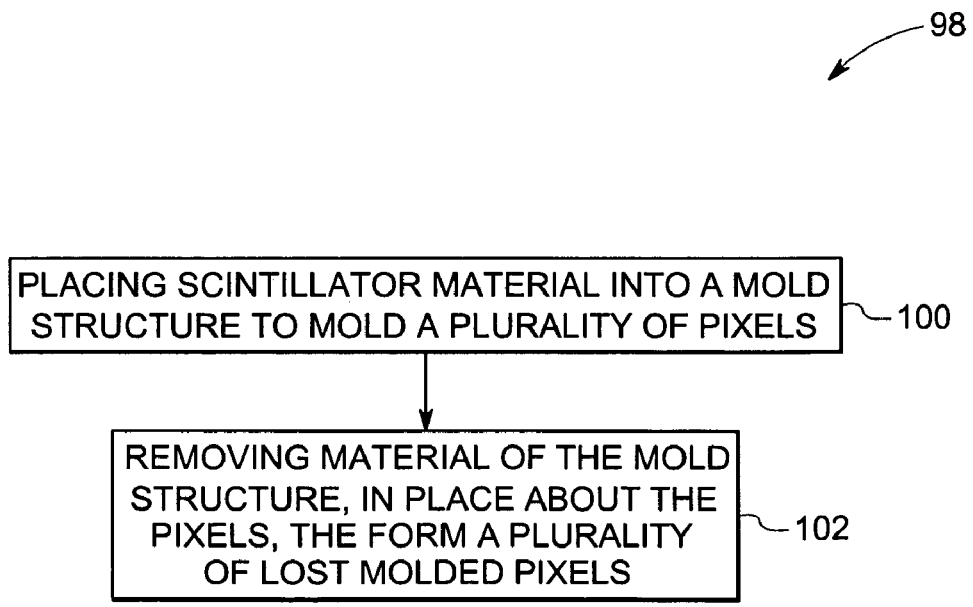

FIG. 11 is a flow chart illustrating one exemplary process 98 for manufacturing the molded or compact form 82 of the pixelated scintillators 26 of FIG. 7 from the lost mold structure 76 of FIG. 6 in accordance with embodiments of the present technique. As illustrated, the process 98 begins by placing scintillator material into the mold structure 76 to mold a plurality of pixels 50 (block 100). In certain embodiments, the act of placing the scintillator material includes providing a slurry, mixture, or other substance including the scintillator material into the cavities 78 of the mold structure 76. For example, a powder form of the scintillator material may be mixed in a fluid, such as water, or alcohol, or alkane, or alkene, or different combinations thereof. The mixture is then poured, injected, or generally supplied into the cavities 78 of the mold structure 76. In certain embodiments, the mixture or slurry has a relatively low viscosity, which facilitates its insertion and formation to the surfaces of the cavities 78 of the mold structure 76. Embodiments of the mixture or slurry also have a certain volumetric percentage of the ceramic scintillator material to ensure that the molded or compact form 82 of the scintillator 26 has a desirable strength. For example, certain embodiments of the mixture or slurry may have between 20 and 78 percent by volume of ceramic scintillator material. In various embodiments, the mixture or slurry may have between 45 and 55 percent by volume of ceramic scintillator material. By further example, one embodiment of the mixture or slurry comprises about 20 percent by volume of liquid (e.g., water—aqueous slurry) and about 60 percent by volume of ceramic scintillator material. The other 20 percent can include salt, binder, or dispersant. For example, a salt such as ammonium chloride may be added to modify the electro-negativity of the ceramic slurry, thereby attracting the particles to one another and achieving more accurate molding of fine details in the mold structure 76. Further, a binder may be added to reduce cracking while drying the slurry. Binder also provides viscosity control and provides green body strength to the compact form 82. In certain embodiments, an organic material, such as polyethylene glycol, or polyethylene oxides, or polyvinyl pyrrolidone, or carbowax, or Duramax B-1001 (a product of Rohm and Hass, Philadelphia, Pa.), or different combinations thereof may be used as the binder. These and other mixtures, percentage compositions, and so forth are within the scope of the present technique. Furthermore, a dispersant such as comprising an additive that acts as a dispersant such as an ammonium polyacrylate, like, Darvan 821A (a product of Vanderbilt Company, Norwalk, Conn.) may be employed to facilitate wetting and to disperse the ceramic material in the solvent.

In certain embodiments, the process 98 of FIG. 11 also includes partially or fully solidifying the scintillator material within the mold structure 76 of FIG. 6. For example, the process 98 may include heating, cooling, and/or generally speeding the solidification of the particular scintillator material, e.g., $(Y,Gd,Eu)_2O_3$, or $(Lu,Tb,Ce)_3Al_5O_{12}$, or $Gd_3Ga_5O_{12}$, or $(Lu,Ce)_3Al_5O_{12}$. In an embodiment using aqueous slurry, the act of heating generates strong capillary action as the water evaporates, thereby attracting the particles closer together (more compact) to increase the strength of the molded or compact form 82 of the pixelated scintillators 26. In certain embodiments, processes such as gelcasting, or solidification of a melt, or low pressure injection, or transfer molding, or extrusion, directional solidification, of the like, may be used to solidify the scintillator material.

In addition, the process 98 of FIG. 11 may include steps to improve the receipt of the scintillator material within the cavities 78 of the mold structure 76 at block 100. In certain embodiments, the cavities 78 have relatively narrow, deep, and complex shapes and surface textures, such as corner cubes and curved end structures to better transport light towards the photodiodes. Depending on the viscosity of the scintillator material (e.g., the mixture or slurry) and the characteristics of these dimensions, shapes, and surface textures, the process 98 may employ a driving force to ensure that the scintillator material completely fills the cavities 78 and the fine detailed features therein. For example, the process 98 may employ a vacuum mechanism to the mold structure 76 to drive out the air inside the cavities 78, thereby facilitating flow of the scintillator material into the cavities 78. Embodiments of the vacuum mechanism apply a uniform vacuum on the cavities 78 of the mold structure 76, such that the walls of the cavities 78 are not overly stressed and the walls return to their original position as the scintillator material fills the cavities 78.

In alternative embodiments, the driving force may include injection molding or other pressurized application techniques. In one exemplary low pressure injection molding technique, a ceramic scintillator material is mixed with a binder, such as Duramax B-1001 (a product of Rohm and Hass, Philadelphia, Pa.). The process 98 proceeds by injecting the mixture with pressure into the cavities 78 of the mold structure 76. In one embodiment, the ceramic scintillator material is mixed with a dispersant and/or surfactant, such as, Darvan 821A (a product of Vanderbilt Company, Norwalk, Conn.). These and other features of the mold structure 76 and the process 98 increase the accuracy and amount of fine details that are molded into the pixels 50 of the molded or compact form 82 of the pixelated scintillators 26.

At block 102, the process 98 of FIG. 11 proceeds by removing the material of the mold structure, in place about the pixels, to form a plurality of lost molded pixels, e.g., the pixels 50. Again, as mentioned above, the act of removing the material of the mold structure 76 may include melting, dissolving, or generally destroying the cohesion of the mold structure's material, such that the material flows, falls, or generally breaks up and separates from the underlying molded or compact form 82 of the pixelated scintillators 26. For example, in certain embodiments, the mold structure 76 is dissolved in chemical reagents, such as toluene, tetrachloroethylene, chloroform, methylene chloride, or different combinations thereof. In this manner, the pixels 50 of the pixelated scintillators 26 retain their integrity and cohesion. Moreover, this lost molding technique facilitates the creation of relatively detailed geometries, surfaces, and dimensions of the plurality of pixels 50.

After removal of the mold structure 76, the lost molded pixelated scintillators 26 may be further enhanced by thermal processes, application of other structures and materials, and so forth. For example, the thermal processes can include heating, cooling, or sintering. For example, the molded or compact form 82 of the pixelated scintillators 26 may be strengthened by sintering. In one embodiment, the process 98 includes a sintering step that heats the molded or compact form 82 over a temperature range of 1500° C. to about 1900° C. over a time interval of about 1 hour to about 10 hours. In some cases, the process 98 may include applying pressure. Additionally, the process 98 may include steps of applying other structures, coating, or materials to the molded or compact form 82 of the pixelated scintillators 26.

Figure 12:
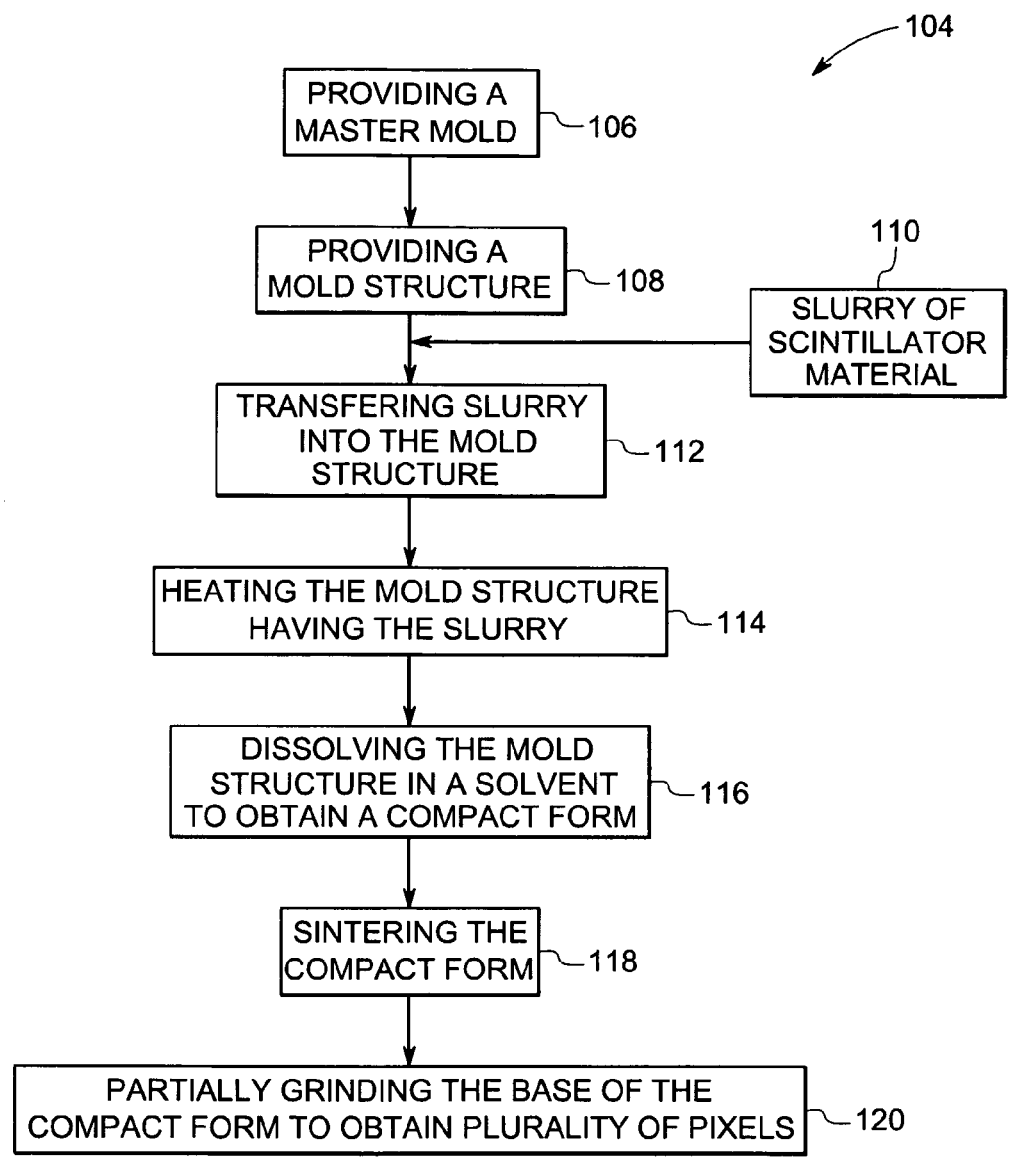

FIG. 12 is a flow chart illustrating an exemplary process 104 for manufacturing the compact form 82 of the pixelated scintillator 26 of FIG. 7 from the master mold 70 of FIG. 5 in accordance with embodiments of the present technique. The process 104 begins by providing a master mold 70 having the model pixels 72 of the pixelated scintillators 26 (block 106). In certain embodiments, the act of providing the master mold 70 involves obtaining a pre-manufactured master mold 70, modifying a pre-existing master mold 70 to have certain features (e.g., serrations, beveled tips, or other modifications of the model pixels 72), or actually manufacturing the master mold 70 as described above. Using this master mold 70, the process 104 proceeds by providing the mold structure 76 of FIG. 6 (block 108). For example, in one embodiment, the mold structure 76 is formed by placing material into the master mold 70 as described with reference to block 96 of process 92 as shown in FIG. 10.

At block 110, a slurry is formed by disposing the scintillator material in a fluid, such as water. In certain embodiments, the viscosity and volumetric percentage of the scintillator material in the slurry may be adjusted depending upon the dimensions of the cavities 78, surface features of the cavities 78, or desirable strength of the pixelated scintillator 26 as described above with reference to block 100 of FIG. 11. At block 112, the slurry formed at block 110 is transferred into the mold structure 76 as described above with reference to block 100 of FIG. 11. At block 114, the slurry is partially or fully solidified within the mold structure 76 of FIG. 6. For example, the process 98 may include heating, cooling, and/or generally speeding the solidification of the particular scintillator material, e.g., $(Y,Gd,Eu)_2O_3$, or $(Lu,Tb,Ce)_3Al_5O_{12}$, or $Gd_3Ga_5O_{12}$, or $(Lu,Ce)_3Al_5O_{12}$ as described above with reference to block 100 of FIG. 11.

At block 116, the material of the mold structure 76 is removed, in place about the pixels, to form the compact form 82, such as described above with reference to block 102 of FIG. 11. At block 118, the process 104 includes sintering the compact form 82, such as described above with reference to block 102 of FIG. 11. Moreover, at block 116, the process 104 includes partially removing the base 84 of the compact form 82 (block 120). For example, in one embodiment, removing includes the act of grinding, cutting, sawing, or laser dicing. In certain embodiments, reflector material is disposed in the plurality of pixels as described above. In these embodiments, the reflector material may be an epoxy-titanium dioxide composite, a thin reflective metallic film, alternating layers of high/low dielectric comprising a dielectric mirror, or different combinations thereof. In these embodiments, the plurality of pixels 50 may be bonded together with the help of the reflector material, and therefore, the base 84 may be completely removed.

Figure 13:
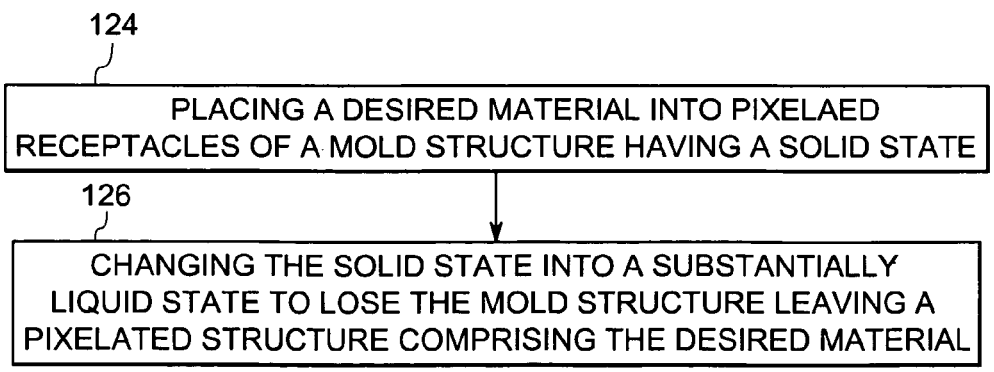

FIG. 13 is a flow chart illustrating an exemplary process 122 for manufacturing the heat sink 62 having the pixelated structure 64 of FIG. 4 from the master mold in accordance with embodiments of the present technique. The process 122 begins by placing a desired material into the pixelated receptacles of a mold structure having a solid state (block 124). In certain embodiments, the desired material may include nitrides, or carbides, or borides of Al, or Si, or Ti, or $Pb(Zr,Ti)O_3$, or $Y_3Al_5O_{12}$, or 89% $ZrO_2$-9% $Y_2O_3$, or $Al_2O_3$, or $Y_3Al_5O_{12}$:Nd, or $Y_3Al_5O_{12}$:Yb, or $Y_2O_3$:Nd, or $Y_2O_3$:Yb, ferrites, or particulate polymer composite, or refractory oxides, or metals, or dielectrics such as, titanates or zirconates of Ca, or Sr, or Ba, ferrites such as (Zn,Mn)$Fe_2O_4$, or (Ni,Zn)$Fe_2O_4$, or different combinations thereof and other suitable materials as described above. At block 126, the solid state of the mold structure is changed into a substantially liquid state to facilitate removal of the pixelated structure from the mold structure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of manufacturing a detector array for an imaging system, the method comprising:
   providing a pixelated scintillator having a plurality of lost molded pixels all integrally formed on a base, wherein the pixelated scintillator comprises a scintillator material adapted to detect radiation.

2. The method according to claim 1, wherein providing the pixelated scintillator comprises:
   placing the scintillator material into a mold structure to mold pixels of the pixelated scintillator; and
   removing material of the mold structure, in place about the pixels, to form the plurality of lost molded pixels all integrally formed on the base.

3. The method according to claim 2, wherein placing the scintillator material comprises:
   transferring a slurry comprising the scintillator material into the mold structure; and
   at least partially solidifying the slurry.

4. The method according to claim 3, wherein the slurry comprises water, or alcohol, or alkane, or alkene, or different combinations thereof.

5. The method according to claim 3, wherein the slurry comprises about 20 to about 70 percent volume of a ceramic.

6. The method according to claim 5, wherein the slurry comprises about 45 to about 55 percent volume of a ceramic.

7. The method according to claim 5, wherein the slurry comprises salt.

8. The method according to claim 3, comprising heating the mold structure comprising the slurry.

9. The method according to claim 2, wherein removing material of the mold structure comprises dissolving the mold structure in place about the pixels.

10. The method according to claim 2, wherein removing material of the mold structure comprises melting the mold structure in place about the pixels.

11. The method according to claim 2, further comprising applying a vacuum to the mold structure.

12. The method according to claim 2, comprising a low pressure injection molding.

13. The method according to claim 1, wherein providing the pixelated scintillator comprises:
   providing a master mold having structural features of the pixelated scintillator and surrounding receptacles adapted to create a mold structure, wherein the mold structure is adapted to receive a detector material, including the scintillator material, to mold the pixelated scintillator.

14. The method according to claim 13, wherein providing the master mold comprises creating the master mold by wire electrical discharge, or machining, or laser lithography, or x-ray lithography, or printing, or different combinations thereof.

15. The method according to claim 13, further comprising providing an end structure, wherein the end structure comprises flat, or curved, or angled ends, or different combinations thereof.

16. The method according to claim 13, wherein the end structure comprises a parabola or ellipse.

17. The method according to claim 13, further comprising placing a scintillator material into the master mold to create a mold structure, wherein the mold structure is materially removable, in place about a scintillator material received therein, to form a lost molded pixelated scintillator.

18. The method according to claim 13, further comprising providing an end structure, wherein the end structure comprises flat, or curved, or angled ends, or different combinations thereof.

19. The method according to claim 13, wherein the end structure comprises a parabola or ellipse.

20. The method according to claim 1, wherein providing the pixelated scintillator comprises:
   providing a mold structure comprising material that is removable, in place, to form the plurality of lost molded pixels;
   forming a compact of the pixelated scintillator in the mold structure, wherein the compact comprises a base and a plurality of pixels, wherein the base and the plurality of pixels are a single structure; and
   materially separating the mold structure, in place, from the compact of the pixelated scintillator.

21. The method according to claim 20, comprising sintering the compact form of the pixelated scintillator.

22. The method according to claim 20, wherein providing the mold structure comprises creating the mold structure by injection molding, or resin transfer molding, or casting, or solidification of a melt, or forging, or stamping, or embossing, or lithography or different combinations thereof.

23. The method according to claim 20, wherein the mold structure comprises camphor, or silicone, or cellulose, or acetate, or hard wax, or co-polymers, or tripolymers, or polystyrene, or polystyrene-polybutadiene, or polycarbonate, or crystal bond, or paraffin wax, or polyethylene, or acrylic, or nylon, or polyethylene glycol, or low density poly ethylene, or high density polyethylene, or different combinations thereof.

24. The method according to claim 23, further comprising providing at least one electronic device configured for converting electrical signals from the at least one light sensor into corresponding digital signals.

25. The method according to claim 20, wherein materially separating the mold structure comprises dissolving the mold structure, in place, by application of a chemical including or toluene, or tetrachloroethylene, or chloroform, or methylene chloride, or dibromomethane, or bromoethylene, or xylene, or acetone, or methyl ethyl ketone, or tetrahydrofuran, or hexane, or different combinations thereof.

26. The method according to claim 1, wherein the pixelated scintillator comprises (Y,Gd,Eu)2O3, or $(Lu,Tb,Ce)_3Al_5O_{12}$, or $Gd_3Ga_5O_{12}$, or $(Lu,Ce)_3Al_5O_{12}$, or different combinations thereof.

27. The method according to claim 1, further comprising providing at least one light sensor adapted to detect light from the pixelated scintillator.

28. The method according to claim 1, wherein the plurality of lost molded pixels and the base are a single structure made of the scintillator material.

29. A method of manufacturing an imaging system, comprising:
  providing a radiation source adapted to transmit radiation through an object; and
  providing a pixelated scintillator having a plurality of pixels formed by a mold structure removed in place about the plurality of pixels, wherein the base and the plurality of pixels are a single structure.

30. The method according to claim 29, wherein providing the radiation source comprises providing an x-ray radiation source, or a beta radiation source, or a gamma radiation source.

31. The method according to claim 29, wherein the imaging system comprises a computed tomography, or X-ray fluoroscopy, or positron emission tomography, or digital x-ray imaging.

32. The method according to claim 31, comprising providing a collimator adapted to collimate the radiation through the object.

33. The method according to claim 31, comprising providing an object support structure between the radiation source and the pixelated scintillator, wherein the object support comprises a human support, or a baggage support, or a mail support, or different combinations thereof.

34. The method according to claim 31, wherein providing the pixelated scintillator comprises providing the plurality of pixels having features molded and left behind from the mold structure melted in place about the features.

35. The method according to claim 29, comprising providing a light sensor adapted to detect light from the pixelated scintillator.

36. The method according to claim 35, comprising providing at least one electronic device configured for converting electrical signals from the light sensor to corresponding digital signals.

37. The method according to claim 36, comprising providing a processor for processing the electrical signals to generate an image of internal features of the object.

38. The method according to claim 29, wherein providing the pixelated scintillator comprises:
  placing a scintillator material into the mold structure to mold the plurality of pixels of the pixelated scintillator; and
  removing material of the mold structure, in place, from the plurality of pixels.

39. The method according to claim 38, wherein the scintillator material is disposed in a mixture comprising an additive that acts as a dispersant such as ammonium polyacrylate.

40. The method according to claim 38, wherein the scintillator material is disposed in a mixture comprising a binder, wherein the binder is an organic material.

41. The method according to claim 40, wherein the binder comprises polyethylene glycol, or polyethylene oxides, or polyvinyl pyrrolidone, or carbowax, or Duramax B-1001, or different combinations thereof.

42. The method according to claim 29, wherein providing the pixelated scintillator comprises providing the plurality of pixels having features molded and left behind from the mold structure dissolved in place about the features.

43. The method according to claim 29, wherein providing the pixelated scintillator comprises providing the plurality of pixels having molded ridges, or serrations, or waves, or dimples, or corner cubes, or different combinations thereof extending lengthwise along each of the plurality of pixels.

44. The method according to claim 29, wherein providing the pixelated scintillator comprises providing the plurality of pixels each having a hexagonal cross-section, or rectangular cross section, or circular cross section, or an combination of plane filling patterns.

45. The method according to claim 44, wherein the end structure comprises a parabola or ellipse.

46. The method according to claim 29, further comprising providing the plurality of pixels each having an end structure, wherein the end structure comprises flat, or curved, or angled ends, or different combinations thereof.

47. The method according to claim 29, wherein the mold structure comprises camphor, or silicone, or cellulose, or acetate, or hard wax, or co-polymers, or tripolymers, or polystyrene, or polystyrene-polybutadiene, or polycarbonate, or crystal bond, or paraffin wax, or polyethylene, or acrylic, or nylon, or polyethylene glycol, or low density polyethylene, or high density polyethylene, or different combinations thereof.

48. The method according to claim 29, wherein the pixelated scintillator comprises $(Y,Gd,Eu)_2O_3$, or $(Lu,Tb,Ce)_3Al_5O_{12}$, or $Gd_3Ga_5O_{12}$, or $(Lu,Ce)_3Al_5O_{12}$, or different combinations thereof.

49. An imaging system, comprising:
  a radiation source configured to transmit radiation through an object; and
  a pixelated scintillator having a single lost molded structure with a plurality of pixels all extending integrally from a base, wherein the plurality of pixels and the base comprise a same material.

50. The imaging system according to claim 49, comprising a sensor configured to convert light from the pixelated scintillator into an electrical signal.

51. The imaging system according to claim 50, comprising at least one electronic device configured to convert the electrical signal into a corresponding digital signal.

52. The imaging system according to claim 50, comprising a processor configured to process the electrical signal to generate an image of internal features of the object.

53. The imaging system according to claim 49, wherein the radiation source comprises an x-ray radiation source, or a beta radiation source, or a gamma radiation source.

54. The imaging system according to claim 49, wherein the imaging system comprises a computed tomography, X-ray fluoroscopy, positron emission tomography, or digital x-ray imaging.

55. The imaging system according to claim 49, comprising a collimator configured to collimate the radiation from the radiation source.

56. The imaging system according to claim 49, wherein the object comprises a human, a baggage, a mail, or different combinations thereof.

57. The imaging system according to claim 49, wherein the pixelated scintillator comprises a sintered ceramic compact.

58. The imaging system according to claim 49, wherein the pixelated scintillator comprises $(Y,Gd,Eu)_2O_3$, or $(Lu,Tb,Ce)_3Al_5O_{12}$, or $Gd_3Ga_5O_{12}$, $(Lu,Ce)_3Al_5O_{12}$, or different combinations thereof.

59. The imaging system according to claim 49, wherein the plurality of pixels comprises a pixel geometry having a hexagonal cross-section, or rectangular cross section, or circular cross section, or a combination of plane filling patterns.

60. The imaging system according to claim 49, wherein the plurality of pixels comprises ridges, or serrations, or waves, or dimples, or corner cubes, or different combinations thereof extending lengthwise along each of the plurality of pixels.

61. The imaging system according to claim 49, wherein the plurality of pixels further comprises an end structure, wherein the end structure comprises flat, or curved, or angled ends, or different combinations thereof.

62. The imaging system according to claim 61, wherein the end structure comprises a parabola or ellipse.

63. The imaging system according to claim 49, wherein the pixelated scintillator comprises a reflector material disposed between the plurality of pixels.

64. The imaging system according to claim 63, wherein the reflector material comprises an epoxy-titanium dioxide composite, a thin reflective metallic film, alternating layers of high/low dielectric comprising a dielectric mirror, or different combinations thereof.

65. A detector for use in imaging system, comprising:
a pixelated scintillator having a plurality of pixels molded, in place, on a base, from a lost mold structure, wherein the plurality of pixels and the base are a single structure made of a scintillator material.

66. The detector according to claim 65, comprising a photo sensor disposed adjacent the pixelated scintillator.

67. The detector according to claim 65, wherein each of the plurality of pixels have a lost molded surface texture.

68. The detector according to claim 65, wherein the plurality of pixels have a molded structure left behind from a dissolved lost mold structure.

69. The detector according to claim 65, wherein the plurality of pixels has a molded structure left behind from a melted lost mold structure.

70. The detector according to claim 65, wherein the pixelated scintillator comprises a sintered ceramic compact.

71. The detector according to claim 65, wherein the pixelated scintillator comprises $(Y,Gd,Eu)_2O_3$, or $(Lu,Tb,Ce)_3Al_5O_{12}$, or $Gd_3Ga_5O_{12}$, or $(Lu,Ce)_3Al_5O_{12}$, or different combinations thereof.

72. The detector according to claim 65, wherein the plurality of pixels comprises a pixel geometry having a hexagonal cross-section, or rectangular cross section, or circular cross section, or an combination of plane filling patterns.

73. The detector according to claim 65, wherein the plurality of comprises ridges, or serrations, or waves, or dimples, or corner cubes, or different combinations thereof extending lengthwise along each of the plurality of pixels.

74. The detector according to claim 65, wherein the plurality of pixels further comprises an end structure, wherein the end structure comprises flat, or curved, or angled ends, or different combinations thereof.

75. The detector according to claim 74, wherein the end structure comprises a parabola or ellipse.

76. The detector according to claim 65, wherein the plurality of pixels comprise a coating of reflector material.

77. The detector according to claim 65, wherein the plurality of pixels extend integrally from the base, and the plurality of pixels and the base are made of a same material comprising the scintillator material.

78. A method of manufacturing a pixelated scintillator, the method comprising:
inserting a substance including a scintillator material into a lost mold; and
dissolving the lost mold leaving a pixelated scintillator having a plurality of pixels attached to a base.

79. The method according to claim 78, wherein inserting the substance including the scintillator material into the lost mold comprises slurry casting, or injection molding, or stamping, or resin transfer molding, or casting, or solidification of a melt, or forging, or embossing, or different combinations thereof.

80. The method according to claim 78, wherein the plurality of pixels comprises a pixel geometry having a hexagonal cross-section, rectangular cross section, circular cross section, or an combination of plane filling patterns.

81. The method according to claim 78, wherein the plurality of pixels comprises ridges, or serrations, or waves, or dimples, or corner cubes, or different combinations thereof extending lengthwise along each of the plurality of pixels.

82. The method according to claim 78, wherein the plurality of pixels further comprises an end structure, wherein the end structure comprises flat, or curved, or angled ends, or different combinations thereof.

83. The method according to claim 82, wherein the end structure comprises a parabola or ellipse.

84. The method according to claim 78, wherein dissolving the lost mold comprises applying to the lost mold toluene, or tetrachloroethylene, or chloroform, or methylene chloride, or dibromomethane, or bromoethylene, or xylene, or acetone, or methyl ethylketone, or tetrahydrofuran, or hexane, or different combinations thereof.

85. The method according to claim 78, wherein dissolving the lost mold comprises breaking down cohesion of the lost mold, the lost mold comprising a silicone, or a cellulose, or an acetate, or a hard wax, or a polystyrene, or a polystyrene-polybutadiene, or a polycarbonate, or a crystal bond, or a paraffin wax, or a polyethylene, or an acrylic, or a nylon, or a polyethylene glycol, or a low density polyethylene, or a high density polyethylene, or different combinations thereof.

86. A method of manufacturing a pixelated scintillator, the method comprising:
inserting a substance including a scintillator material into a lost mold; and
melting the lost mold leaving a pixelated scintillator having a plurality of pixels extending from a base.

87. The method according to claim 86, wherein inserting the substance including the scintillator material into the lost mold comprises injection molding, or resin transfer molding, or mechanical machining methods, or casting, or solidification of a melt, or forging, or stamping, or embossing, or different combinations thereof.

88. The method according to claim 86, wherein the plurality of pixels comprises a pixel geometry having a hexagonal cross-section, or rectangular cross section, or circular cross section, or a combination of plane filling patterns.

89. The method according to claim 86, wherein the plurality of pixels comprises ridges, or serrations, or waves, or dimples, or corner cubes, or different combinations thereof extending lengthwise along each of the plurality of pixels.

90. The method according to claim 86, wherein the plurality of pixels further comprises an end structure, wherein the end structure comprises flat, or curved, or angled ends, or different combinations thereof.

91. The method according to claim 90, wherein the end structure comprises a parabola or ellipse.

92. The method according to claim 86, wherein melting comprises heating the lost mold to a temperature in a range from about 25° C. to about 150° C.

93. The method according to claim 86, wherein melting comprises heating the lost mold, the lost mold comprising silicone, or a cellulose, or an acetate, or a hard wax, or a polystyrene, or a polystyrene-polybutadiene, or a polycarbonate, or a crystal bond, or a paraffin wax, or a polyethylene, or an acrylic, or a nylon, or a polyethylene glycol, or a low density polyethylene, or a high density polyethylene, or different combinations thereof.

94. A method of manufacturing a system having a pixelated structure, the method comprising:
placing a desired material into pixelated receptacles of a mold structure having a solid state; and
changing the solid state into a substantially liquid state to lose the mold structure leaving a pixelated structure comprising the desired material, wherein the pixelated structure comprises a plurality of pixels extending from a base.

95. The method according to claim 94, wherein the desired material comprises one of nitrides, or carbides, or borides of Al, Si or Ti, or different combinations thereof.

96. The method according to claim 94, wherein the desired material comprises one of $Pb(Zr,Ti)O_3$, or $Y_3Al_5O_{12}$, or 89% $ZrO_2$-9% $Y_2O_3$, or $Al_2O_3$, or $Y_3Al_5O_{12}$:Nd, or $Y_3Al_5O_{12}$:Yb, or $Y_2O_3$:Nd, or $Y_2O_3$:Yb, or different combinations thereof.

97. The method according to claim 94, wherein the desired material comprises one of particulate polymer composite, or refractory oxides, or metals, or dielectrics, or different combinations thereof.

98. The method according to claim 97, wherein the dielectric comprises titanates, or zirconates of Ca, or Sr, or Ba, or different combinations thereof.

99. The method according to claim 97, wherein the dielectric comprises one of $(Zn,Mn)Fe_2O_4$, or $(Ni,Zn)Fe_2O_4$.

100. The method according to claim 94, wherein changing the solid state into a substantially liquid state comprises melting the mold structure.

101. The method according to claim 94, wherein changing the solid state into a substantially liquid state comprises dissolving the mold structure.

102. The method according to claim 94, comprising providing a heat sink comprising the pixelated structure.

103. The method according to claim 94, comprising providing a sensor array comprising the pixelated structure.

104. The method according to claim 94, comprising providing a laser comprising the pixelated structure.

105. The method according to claim 94, comprising providing a radiative heater comprising the pixelated structure.

106. The method according to claim 94, comprising providing a parallel plate capacitor comprising the pixelated structure.

* * * * *